UNITED STATES PATENT OFFICE.

RENÉ DUBRISAY, OF PARIS, FRANCE.

PROCESS FOR PRODUCING DAMP-PROOF MATCHES.

1,363,095. Specification of Letters Patent. Patented Dec. 21, 1920.

No Drawing. Application filed June 29, 1920. Serial No. 392,799.

*To all whom it may concern:*

Be it known that I, RENÉ DUBRISAY, a citizen of the French Republic, residing at No. 37 Rue Vaneau, Paris, France, have invented certain new and useful Improvements in Processes for Producing Damp-Proof Matches, of which the following is a specification.

The heads of matches are, as is well known, made of active substances such as phosphorus, sesquisulfid of phosphorus, potassium chlorate, etc. By the methods at present in use these substances are amalgamated and fixed to a stalk by means of some viscous material, generally gum or glue. When dry the match head thus formed at the end of the stalk may be lighted by striking against some suitable object or by friction on a special striker (safety matches).

This process possesses a disadvantage in that the various agglutinating substances which have so far been tried for the purpose are all more or less liable to be affected by the action of water; when subjected to a damp atmosphere the head softens and it becomes impossible to light the match.

The present invention is a method of manufacture for the heads of matches whereby they are rendered impervious to a damp atmosphere. The agglutinating substance is formed by the condensation product of a mixture comprising a body possessing the functional properties of phenol and an aldehyde. It is a well known fact that the phenols and the aldehydes, particularly formic aldehyde, react under the influence of heat and are capable of producing hard and insoluble bodies in conjunction with suitable catalyzers, either alkalis or acids.

The process embodied in the present invention consists in agglutinating the active and inert substances forming the match head and in fixing the head on the stalk with the products of the resultant reaction.

This may be done in several different ways according to whether the paste forming the match head is prepared by a direct process combining all the constituent elements of the agglutinating mixture, or by combining one or two of them only and subsequently subjecting the product to the action of the others.

Any one of the following methods of procedure may be used:

(1.) Prepare a paste for the matches by pulverizing the constituent elements and placing them in a bath containing water, phenol, aldehyde and a catalyzer (soda, for instance). The stalks are dipped into this bath and after removal are kept as long as necessary in a temperature sufficient to harden the head.

(2.) Prepare a paste by adding the pulverized constituents of the match head to a bath containing water, aldehyde and phenol. The stalks are dipped, and the matches thus obtained are subjected to the action of the catalyzer by keeping them, for instance, in some place heated to a sufficient temperature and in which the catalytic agent (hydrochloric acid, for instance) has been introduced in the form of vapor. The action of the temperature and the catalyzer is allowed to continue until the head is of the required hardness.

(3.) Prepare a paste by mixing the powdered constituents with phenol, water and the catalyzer (soda, for instance). The stalks are dipped into this paste and are then subjected to the action of the aldehyde (which may, for example, be formol) in the form of vapor.

(4.) Prepare the paste by adding the powdered constituents to water and phenol. The match heads are then subjected to the simultaneous action of the aldehyde and the catalyzer, both of which may be either in a liquid state or in the form of vapor.

Among the various aldehydes which may be employed, formic aldehyde is particularly to be recommended on the grounds of convenience and economy. Of the substances possessing the functional properties of phenol, the use of resorcin may be advised because of the rapidity with which the reaction products are formed and the possibility of hardening the heads without the necessity of placing the matches in a high temperature.

As an example the following formula may be suggested as suitable for the composition of the paste:

Resorcin _____ 15 parts
Formol (commercial solution)___ 15 parts
Soda (20% solution of NaOH)___ 14 parts
Potassium chlorate_____ 35 parts
Powdered glass_____ 21 parts The materials are ground and mixed in the usual manner, and the stalks dipped into the bath. The matches may then be left in an ordinary temperature, when the heads become sufficiently hard to enable them to be boxed in about an hour. The reaction of the phenol and the aldehyde takes place subsequently. On the other hand, the matches may, after being dipped, be placed in an incubator heated to 50° or thereabout, when they begin to harden after some minutes. Under the influence of any convenient temperature between 30° and 40°, the length of the drying process can be much reduced in relation to that necessary in conjunction with the ordinary methods of manufacture.

Matches prepared according to the above formula are of the safety type and can only be used with a special striker. Matches which may be lighted by striking against any suitable object can be obtained by introducing a little phosphorus or sesquisulfid of phosphorus into the composition of the paste.

What I claim is—

1. A process for the production of damp proof matches, which consists in the utilization in the paste, as agglutinating material of the reaction product of a body possessing the functional properties of an aldehyde with a body possessing the functional properties of phenol, in the presence of a catalyzer.

2. A process for the production of damp proof matches which consists in the utilization in the paste as agglutinating material, of the reaction product of formol with a body possessing the functional properties of phenol, in the presence of a catalyzer.

3. A process for the production of damp proof matches which consists in the utilization in the paste, as agglutinating material, of the reaction product of a body possessing the functional properties of an aldehyde with resorcin, in the presence of a catalyzer.

4. A process for the production of damp proof matches which consists in the utilization in the paste as agglutinating material, of the reaction product of formol with resorcin in the presence of a catalyzer.

In witness whereof I have hereunto set my hand in the presence of a witness.

RENÉ DUBRISAY.

Witness:
CLEMENT S. EDWARDS.